United States Patent
Silberman et al.

(10) Patent No.: US 11,556,846 B2
(45) Date of Patent: Jan. 17, 2023

(54) COLLABORATIVE MULTI-PARTIES/MULTI-SOURCES MACHINE LEARNING FOR AFFINITY ASSESSMENT, PERFORMANCE SCORING, AND RECOMMENDATION MAKING

(71) Applicant: Cerebri AI Inc., Austin, TX (US)

(72) Inventors: Gabriel Mauricio Silberman, Austin, TX (US); Alain Charles Briancon, Germantown, MD (US); Lee David Harper, Austin, TX (US); Luke Philip Reding, Washington, DC (US); David Alexander Curry, Austin, TX (US); Jean Joseph Belanger, Austin, TX (US); Michael Thomas Wegan, East Lansing, MI (US); Thejas Narayana Prasad, Spring, TX (US)

(73) Assignee: Cerebri AI Inc., Austin, TX (US)

( * ) Notice: Subject to any disclaimer, the term of this patent is extended or adjusted under 35 U.S.C. 154(b) by 652 days.

(21) Appl. No.: 16/592,317

(22) Filed: Oct. 3, 2019

(65) Prior Publication Data
US 2020/0111022 A1 Apr. 9, 2020

Related U.S. Application Data

(60) Provisional application No. 62/740,858, filed on Oct. 3, 2018.

(51) Int. Cl.
| | | |
|---|---|---|
| G06F 21/62 | (2013.01) | |
| G06N 20/00 | (2019.01) | |
| G06F 21/57 | (2013.01) | |
| G06N 5/04 | (2006.01) | |
| H04L 67/10 | (2022.01) | |

(52) U.S. Cl.
CPC .......... *G06N 20/00* (2019.01); *G06F 21/577* (2013.01); *G06N 5/04* (2013.01); *G06F 2221/034* (2013.01); *H04L 67/10* (2013.01)

(58) Field of Classification Search
CPC ................ G06F 21/62; G06F 21/6245; G06F 2212/1032; G06N 20/00
See application file for complete search history.

(56) References Cited

U.S. PATENT DOCUMENTS

| | | | |
|---|---|---|---|
| 10,242,258 B2 | 3/2019 | Guo | |
| 10,417,350 B1 | 9/2019 | Mohamed | |
| 10,652,565 B1 * | 5/2020 | Zhang | .................. H04N 19/463 |
| 10,810,106 B1 * | 10/2020 | Amit | .................... G06F 11/3604 |
| 10,878,318 B2 * | 12/2020 | Sharifi | ................ G06N 3/0454 |
| 10,977,711 B1 * | 4/2021 | Verma | .................. G06K 9/6219 |

(Continued)

OTHER PUBLICATIONS

Smith, Virginia "Microsoft Research Faculty Summit 2018: Systems Fueling future disruptions" slide show, Aug. 2018, https://www.microsoft.com/en-us/research/uploads/prod/2018/08/AI_for_AI_Systems_Virginia_Smith_Ganesh_Ananthanarayan.pdf.

(Continued)

*Primary Examiner* — Thaddeus J Plecha
(74) *Attorney, Agent, or Firm* — Pillsbury Winthrop Shaw Pittman LLP

(57) ABSTRACT

Provided is a process that includes sharing information among two or more parties or systems for modeling and decision-making purposes, while limiting the exposure of details either too sensitive to share, or whose sharing is controlled by laws, regulations, or business needs.

23 Claims, 5 Drawing Sheets

(56) References Cited

U.S. PATENT DOCUMENTS

| | | | |
|---|---|---|---|
| 10,997,499 B1 | 5/2021 | Kayyoor | |
| 2016/0266939 A1 | 9/2016 | Shear et al. | |
| 2016/0344770 A1* | 11/2016 | Verma | H04L 51/42 |
| 2017/0039186 A1 | 2/2017 | Pestian et al. | |
| 2017/0091274 A1 | 3/2017 | Guo | |
| 2017/0161633 A1 | 6/2017 | Clinchant et al. | |
| 2018/0060722 A1 | 3/2018 | Hwang et al. | |
| 2018/0060757 A1 | 3/2018 | Li | |
| 2018/0114113 A1 | 4/2018 | Ghahramani et al. | |
| 2018/0198838 A1 | 7/2018 | Murgia et al. | |
| 2018/0268295 A1 | 9/2018 | Endoh | |
| 2018/0276560 A1 | 9/2018 | Hu et al. | |
| 2018/0336486 A1* | 11/2018 | Chu | G06N 20/00 |
| 2018/0225548 A1 | 12/2018 | Ishimaru et al. | |
| 2019/0012609 A1* | 1/2019 | Fishler | G06N 20/00 |
| 2019/0102574 A1* | 4/2019 | Roberts | G06Q 30/0631 |
| 2019/0182059 A1* | 6/2019 | Abdou | G06N 7/005 |
| 2019/0227980 A1* | 7/2019 | McMahan | G06K 9/6256 |
| 2020/0151591 A1 | 5/2020 | Li | |
| 2021/0004912 A1 | 1/2021 | Stark | |
| 2021/0141926 A1* | 5/2021 | Ferrer | G06V 40/169 |

OTHER PUBLICATIONS

McMahan et al., "Federated Learning: Collaborative Machine Learning without Centralized Training Data," Google AI Blog, https://ai.googleblog.com/2017/04/federated-learning-collaborative.html Apr. 6, 2017 (7 pages).

Internet Archive "Salesforce Einstein: Machine Learning In A Multi-Tenant Environment," https://web.archive.org/web/20170217002707/https://www.salesforce.com/products/ captured Feb. 17, 2017 (7 pages).

Internet Archive "IBM Reference Architecture for AI Infrastructure delivers on the promise of AI computing," Spectrum Computing for an AI Infrastructure, https://www.ibm.com/it-infrastructure/spectrum-computing/ai captured Dec. 3, 2018 (7 pages).

Internet Archive "Causal Inference and Counterfactual Reasoning," https://www.microsoft.com/en-us/research/group/causal-inference/ Jun. 1, 2019 (6 pages).

"Applied Machine Learning Researcher," Apple Job Listing from ZipRecruter, https://www.ziprecruiter.com/c/Apple/Job/Applied-Machine-Learning-Researcher/-in-Seattle,WA?jid=DO9eb8016792d0f4f220bec9f11d54465f Aug. 15, 2019 (4 pages).

Notice of Allowance in related U.S. Appl. No. 16/151,136 dated Mar. 7, 2022, pp. 1-8.

* cited by examiner

COLLABORATIVE MULTI-PARTIES/MULTI-SOURCES MACHINE LEARNING FOR AFFINITY ASSESSMENT, PERFORMANCE SCORING, AND RECOMMENDATION MAKING

CROSS-REFERENCE TO RELATED APPLICATIONS

The present application claims the benefit of in U.S. Patent App. 62/740,858, titled COLLABORATIVE MULTI-PARTIES/MULTI-SOURCES MACHINE LEARNING FOR AFFINITY ASSESSMENT, PERFORMANCE SCORING, AND RECOMMENDATION MAKING, filed 3 Oct. 2018. The entire contents of each aforementioned patent filing are hereby incorporated by reference.

BACKGROUND

1. Field

The present disclosure relates generally to machine learning and, more specifically, to collaborative multi-parties/multi-sources machine learning for affinity assessment, performance scoring, and recommendation making.

2. Description of the Related Art

It is frequently the case that one entity stores information relevant to a machine-learning based determination being made by another entity, but is not able to share that information. For example, one party may be prohibited from sharing information due to security constraints, regulatory constraints, or contractual constraints. As a result, machine-learning based determinations made by the other entity may be impaired by the lack of access to potentially relevant information, and parties may design systems that are globally sub-optimal across a set of such entities.

SUMMARY

The following is a non-exhaustive listing of some aspects of the present techniques. These and other aspects are described in the following disclosure.

Some aspects include a process, including: obtaining, with one or more processors, a first trained machine learning model, wherein: the first machine learning model is trained on a first training set that includes data the first entity is not permitted to provide to a second entity, the first trained machine learning model is configured to output tokens, and the tokens do not reveal more than a threshold amount of information about the data the first entity is not permitted to provide to the second entity; receiving, with one or more processors, a first set of input features with the first trained machine learning model and, in response, outputting a first token; and causing, with one or more processors, the first token and a first value associated with the first token to be input into second trained machine learning model accessible to the second entity, wherein the first value associated with the first token is a token-context value corresponding to the first token.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
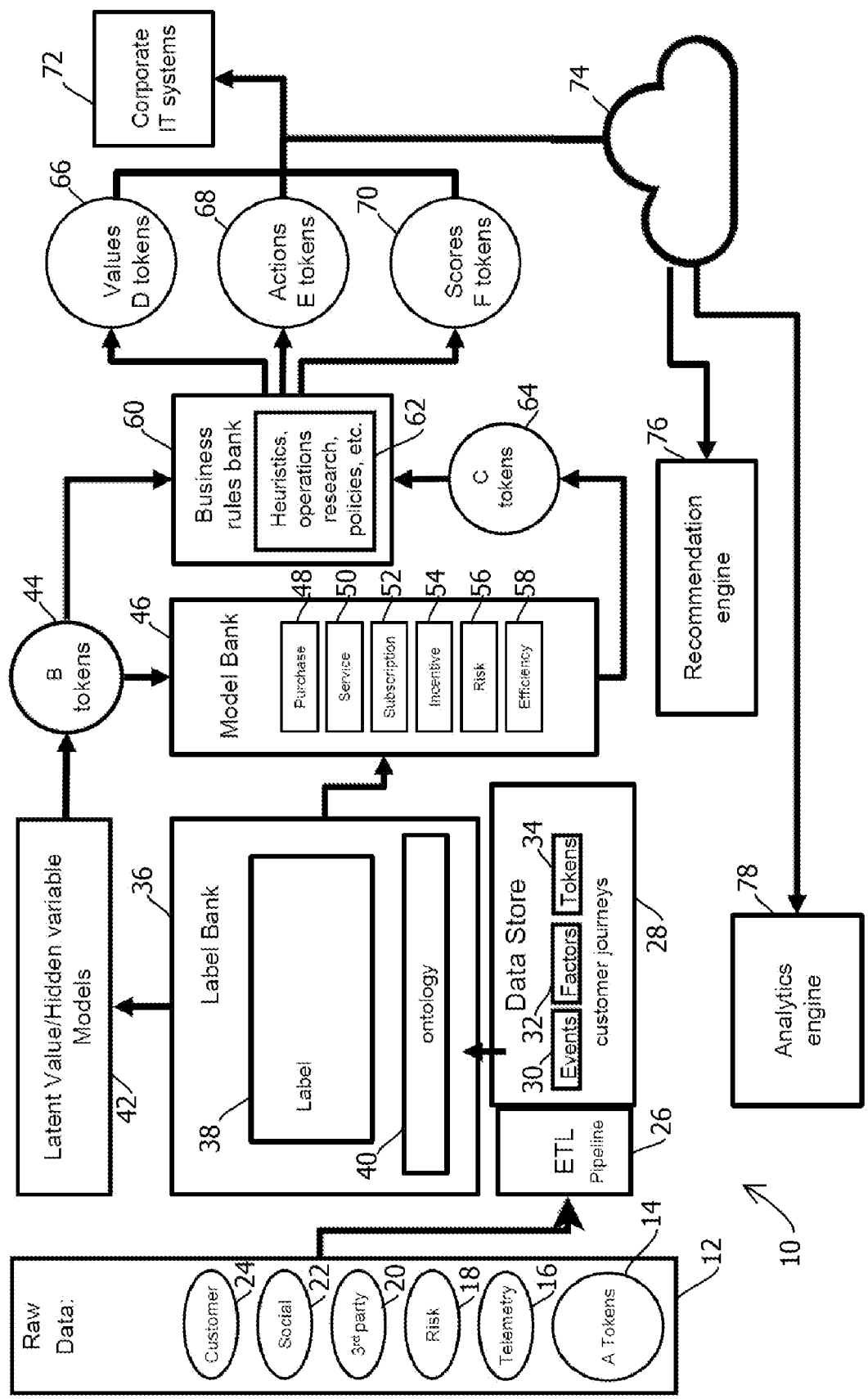
FIG. 1 is a schematic representation of a computing architecture implementing token-based decision making in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

It is frequently the case that one entity stores information relevant to a determination being made by another entity, but is not able to share that information. Two or more entities often wish to share information to facilitate or otherwise improve the quality of joint or independent decision-making. To do so, they often face obstacles of aggregating the information each of the entities own or otherwise hold, which constrains the space of suitable computing architectures. These constraints may arise from a variety of concerns, including regulatory compliance or business issues. In some cases, the entities may be different organizations, or in some cases, the entities may be within the same organization. In some cases, the entities process data concurrently, or in some cases, the entities process data at different times.

An example is continuous risk assessment of an entity's cybersecurity posture. An entity's exposure to cybersecurity risk, or cyber-risk is typically made up of many factors, including systems (e.g., firewall effectiveness, update of operating systems and antivirus signatures, disabling of USB ports) and proper management processes (e.g., proper updating of system access controls during on-boarding, role change, and off-boarding of personnel, human engineering training). To properly evaluate these risk factors within an entity's specific cyber context, an understanding on how each factor contributes, positively or negatively, is beneficial. But this understanding often requires experience and expertise well beyond those of a single entity. Yet, specifics of cybersecurity incidents are not usually shared with external parties for a variety of reasons (e.g., legal exposure and embarrassment impacting a brand).

To mitigate this issue and related issues in other domains, in some embodiments, a model may be built and trained using data owned or collected by a centralized cybersecurity provider, or by sharing information by (re-) training a model using data owned by individual entities (repeated across many of them, as needed). This model may properly identify and weigh risk factors using a much broader view of cyber risk than any individual entity may be able to access, and it may be built without revealing any specific incidents each entity may have experienced.

In some embodiments, a first machine learning model (e.g., an upstream model in a pipeline of models) is built and trained by a first party. The data used to train the model is owned by or accessible to the first party, but in some cases not a second party discussed below. In some embodiments, when applied on a new set of data by the first party, the model produces an output. This output, called a token, can represent the set of data, labels, modeling use, outputs, features, or recommendation, in some embodiments without revealing any of the details (or information of greater than a threshold amount, e.g., as measured by entropy) for individual pieces of information (e.g., in the training set). Such tokens may contain (or be) a single numerical value, a string, a label, vectors of values or labels, or combinations thereof. In some cases, the first model may output a token responsive to a set of input features at runtime (e.g., at inference time, after training, during use).

In some embodiments, a second machine learning model (e.g., a downstream model in the pipeline of models) is built and trained by a second party that is different from the first party. (The terms "party" and "entity" are used interchangeably.) This model may use (e.g., be trained upon, or take as input during runtime) data owned by or accessible to the second party and the tokens output by the model built, trained and used by the first party. In some cases, the token is output along with (and an association is maintained with) at least one token-context value (e.g., one of the features in the set input into the first model, or a value associated therewith, like a zip code, unique ID, or the like, with the desired level of anonymity), which may be shared between the two parties for the models to synchronize. In some cases, the set of input features of the second model includes both data accessible to the second entity and one or more token/token-context value pairs. In some cases, the token-context value is mapped onto a corresponding value of the second entity's data that is input into the second model, e.g., by selecting a coarser version of a value. Unlike key values for database joining, it is not necessary for the information to tie two individual sets of data for the model to be trained. It is sufficient to narrow that relationship to a group of sets of data in the first training set of the first entity (e.g., all sets of data with the same zip code). Thus, the amount of information revealed may be modulated based on the entropy of the type of information selected for the token-context value. Low entropy values, like nationality, may reveal relatively little information to the second entity, while high entropy values (like a residential address) may reveal more.

The more information items shared between the parties (e.g. in the tokens, within the scope of what information-sharing constraints permit), the better the expected quality of the results for the model when used in production (e.g., at runtime, like at inference time) by the second party. In particular, the second entity's model's performance is expected to be highest when both parties are able to share sufficient information to identify a specific individual within the datasets owned by each of the parties involved.

In some embodiments, the relationship between the token-context value of the first party and a corresponding value of the second party can be injective, surjective, non-injective, non-surjective, or bijective. For instance, in some embodiments, two parties involved in part of transaction with a consumer (e.g., car dealer and bank providing loans) share the identify information are likely to have sufficient information to identify a specific customer within their datasets, e.g., name, date of birth, address, government issued documents like a driver's license.

It is worth noting that even if both parties have full information about a particular individual, the information one party sends to the other, in the form of a token, need not (and in some cases does not) explicitly contain such information. Thus, some embodiments may convey information in a way that is compliant with privacy regulations or business rules that forbid more explicit forms of sharing. In some cases, the protection of secret information may exceed that afforded by techniques like use of pseudonymous identifiers, which may still uniquely identify a record when combined with sufficient information associated with the secret record.

In some embodiments, a privacy-preserving machine learning system is provided in the cloud to facilitate use cases in which multiple parties to contribute confidential data for use as training data without breaching the confidentiality and in a way that is compliant with privacy regulations or business rules that forbid more explicit forms of sharing. This is expected to facilitate higher quality and more accurate machine learning outcomes to be obtained. Two or more entities may perform collaborative machine learning whilst preserving at least some or all of the confidentiality of their individual data sets. This, in some embodiments, is achieved without the need for complex cryptographic tools such as fully homomorphic encryption, which may introduce large runtime overheads (though embodiments are also consistent with use of homomorphic encryption)

In some embodiments, a machine learning model is built based on data obtained from different participating entities. Each entity may aggregate their data and physically place the aggregated data in one place, and then use a trained machine learning to build a model based on the aggregated data. Or in some embodiments, different models are trained on different data that is never co-mingled.

In some embodiments, machine learning models combined with homomorphic encryption or differential privacy may be implemented to train such models while facilitating preservation of data confidentiality. Model training may produce encrypted results that, when decrypted, match the training results that would be obtained from training with the unencrypted training data. The output results of the model training may be returned to the entities and each entity may decrypt and obtain the final results.

Pairs of tokens and token-context values are those corresponding to the same set of input features to the upstream (or first-party) model. Such pairs may provide information to the downstream (or second-party) model without revealing at least some information upon which the tokens are based, as explained below with reference to secret random variables, and similar affordances are expected with respect to other types of secret values (e.g., nominal values).

For example, the upstream model's set of input features may include a secret random variable, e.g., a measurable value produced by an at-least partially random process and that is secret relative to an entity operating a downstream model but not the entity operating the upstream model. For instance, in a cybersecurity use-case, the secret random variable may be a percentage of users in a company having a password of less than a threshold number of characters, and the upstream model may output a token indicative of cybersecurity risk. The probability distribution of that secret random variable may have a variance of 10 percentage points, and the secret value may be 40% of users. This secret value may be a value that the company does not intend to share. The upstream model may output a token based on this input feature and a variety of other features indicative of cybersecurity risk to output a cybersecurity-risk token.

While a secret random variable's value may be input into the upstream model, this value may be inaccessible to the downstream model (e.g., one operated by a different entity from the upstream model). The secret random variable may have a first probability distribution, and that distribution may exhibit a first amount dispersion (e.g., as quantified by variance or standard deviation). The token may be configured to reduce this amount of dispersion in a probability distribution of the secret random variable conditional on both the token's value and the token-context value, and the amount of reduction may be modulated by the token-context value. For instance, a conditional probability distribution of the secret random variable conditional on a given token and a first token-context value may exhibit a second amount of dispersion that is smaller than the first amount of dispersion. And a conditional probability distribution of the secret random variable conditional on the given token and a second token-context value may exhibit a third amount of dispersion that is smaller than the first amount of dispersion and the second amount of dispersion. In these examples, a measure of central tendency of the conditional probability distributions may match or correspond to the secret random variable's value that is input to the first model (though that measure of central tendency may not be accessible to the downstream model, e.g., just the token and token-context value may be sent downstream).

Even more robust use-cases may involve multiple secret random variables having values input to the first model in each set of inputs. In these cases, the conditional probability distribution for each individual secret random variable (given a token and token-context value) may be larger than that of the probability distribution of the respective secret random variable itself, e.g., due to interactions between the different secret random variables affecting the token. In some embodiments, the token may be based on (e.g., equal to, or otherwise based on) a principle component of the input features (or non-token-context input features) of the upstream model with respect to some objective metric of the upstream model (e.g., the upstream model may be quantifying cybersecurity risk based on a set of input features, and a metric of such risk may be the objective metric). In some cases, embodiments may maximize (or increase relative to other approaches) the ratio of the amount of information about the objective metric that is conveyed by the token to the amount of information about any one input secret random variable that is conveyed by the token.

In some embodiments, noise (e.g., Gaussian noise, random values, etc.) may be combined with model results in the output tokens. The parameters of a noise generator may be predetermined by the dimensions of the data, the parameters of the trained machine learning algorithm, and security requirements. In some embodiments, noise generation parameters are data-independent to reduce the likelihood of the second entity inferring the data used during the training (or guaranteeing that it does not).

Further, in cases where the tokens are used to train the second model, some embodiments may implement differential privacy techniques, e.g., by randomizing the token-context value in a set of such values such that a measure of central tendency remains unchanged or within some threshold of the original value. In some cases, an amount of such noise added to the token-context values (e.g., a variance of the distribution of changes) may be modulated based on an entropy of the token-context value (e.g., increasing noise responsive to high entropy types of token-context values) or an amount of information permitted to be conveyed (e.g., increasing noise responsive to tight constraints on information conveyed).

In some embodiments, the first party may train its model, using its own data, and then send the trained model itself to the second party, again without providing access to at least some, or all, of the training set. This model may contain none of the first party's data explicitly, e.g., the degrees of freedom of the model may be selected relative to the size of the training set to effect a lossy compression of the training set. Rather, that data may be represented by how the model processes new information. In such embodiments, the second party may run the model in production, using as inputs its own data. This is expected to be helpful if the language used to develop the model is different from the language to deploy it (e.g., Python™ to Apache Spark™).

For this case, the parties (i.e., the computers or processes running thereon on behalf of the parties) may share the nature of the features (not the actual data) used by each party, and the models may be engineered based on this information so that the features used in building and training the model by the first party are compatible with the features used to run the model in production by the second party.

In some embodiments, the first party to build its model may send it to the second party for the second party to train the model using the second party's data.

In some embodiments, the first party may have a subset of the data of the second party, to run modeling and provide a tokenized output so the second party can verify the quality of the model. This can be used to validate the bona-fide (technical or business) of the second party.

Some embodiments may jointly optimize models of the first entity and the second entity.

In some embodiments, the first party builds time-series based on subject-entities records and trains a number of models using the first party's data to create, and either provide output of classifications, features, or combination or transformation thereof as tokens, to the second party to use in conjunction with the second party's data to extend the creation of subject-entities records to time series based models. If the transformation is injective, then the second entity can take advantage of the information passed by the first model even without direct knowledge of features used in classifications.

For example, a single party may use this process to bridge between internal organizations prevented from sharing their data, or for using legacy models trained on datasets no longer available, to feed into newly developed models. Another example contemplated use-case is when different internal organizations update models (trainings) or apply models (applications) at different time frames or different systems.

In some embodiments, the first party may be unable or not allowed to send any (or certain) raw information, whether models, to the second party. In such a case, the first party may devise a set of transformations and tokens that maintain the underlying statistical properties of the data and allow a model to be optimized and trained by a second party based on such transformations and tokens.

In some embodiments, two parties involved in a decision-making process may be extended to cases involving more than two such parties. The use of a third party as intermediary extends to the general case as well.

In some embodiments, a business rule may be implemented by a party based on the output (work output) of a pair of upstream models (e.g., two instances of types of the model of the first entity above). In this example, the output of two models may be combined (with an OR method, best F1, or various other ensemble approaches, etc.) by a third party. The third party may feed information back (e.g., in the form or a token or other information) to the two parties to improve their models or recommendations.

Some embodiments may implement joint decisions.

The creation of meta-models (models of models, models fitting models, jointly optimized models) is expected to be an efficient way to create machine learning models, operational models, customer journeys, or data stores. Using tokens that represent all or part of models, some embodiments may construct customer journeys that span multiple entities (internal departments, P&L centers in a multinational, or different companies or groups), such customer journeys like those described in U.S. patent application Ser. No. 15/456,059, titled BUSINESS ARTIFICIAL INTELLIGENCE MANAGEMENT ENGINE, the contents of which are hereby incorporated by reference.

This is expected to allow management of PII (personal identifiable information) at a granular level. A PII policy may be enforced at an incremental level (model component when dealing with model, model when dealing with meta-models).

In some embodiments, the level of tokenization can be set through machine learning methods, or through business rules. It can be set by the sharing entity or collaboratively through an exchange.

In some embodiments, the token may contain the rule for processing both from a business perspective (who has the right to use and the nature of the use) or technical perspective (what is the best way to combine/aggregate/confront the output of the models.)

In some embodiments, the tokens can be stored in a repository. This is expected to allow for models and recommendations to be integrated or used in an asynchronous manner.

Some embodiments may implement tamper-proof logs.

Protecting the integrity of model sharing among parties presents similar challenges to those faced by multi-component systems relying on passing information among components susceptible to corruption or repudiation. They include ensuring the exchange of information among the parties is not compromised and ensuring no party is able to repudiate their role in the model sharing process. These issues exist whether sharing is accomplished by transferring models among parties or accessing them as SaaS, or passing them through an exchange.

In the model-sharing context, in some embodiments, both models and the data used to trained them may be protected from potential corruption and repudiation. To record them fully in a blockchain is impractical in some use cases and may violate privacy constraints. In some embodiments, a hash code (like a cryptographic hash code, such as SHA-256 and the like) of sufficient complexity may be created to represent a model or the set of data used to train it, or output, e.g., by inputting the represented information into a hash function and storing the result on-chain.

For the above described scenarios, models and data would may be "hash-logged" as follows ("new data" refers to the features presented to the trained model to generate a result).

Some embodiments may integrate with blockchain, monetization, and cost management techniques. In some embodiments, input features to the described models may be events in a customer journey like those described in in U.S. patent application Ser. No. 15/456,059, titled BUSINESS ARTIFICIAL INTELLIGENCE MANAGEMENT ENGINE, the contents of which are hereby incorporated by reference. In some cases, input features are formed by binning or classifying such events, e.g., a feature may indicate whether an event of a designated type occurred within a threshold duration of time, like within a preceding week, month, quarter, or year, or occurred within such windows more than a threshold number of times.

In some embodiments, tokens being passed can be a list of input or processing parameters, output or other intermediate partial representation of models. Different levels of granularity can be passed. A common ontology of tokens may be created for reference. A token exchange system can facilitate the exchange of information.

In another embodiment, access to the token can be controlled through a set of business or economics rules. The token may be limited in scope, time (e.g., a use-until date), location (e.g., a use within territory criterion or set of IP addresses), or the like. This is expected to facilitate monetization of data owned by a party, without revealing much about the data itself.

In some embodiments, the tokens are integrated in a blockchain system and are engineered to be smaller in size than a complete model. A monetary value may be assigned to the token itself. The quality of the token from a modeling perspective can be used as proof of work or proof of stake.

A token with a lot of information or a lot of impact could be valued more than a token with less information or impact. Impact might be measured in business terms, model lift, or feature importance.

Other example use-cases include the following:
  a. For example, a car dealer wants to work with a bank to provide a customer with a car lease or loan. The customer may have a long history with both the dealer and the bank, but the car dealer is only allowed to share the information the customer provides in the lease/loan application (e.g., name, address, DOB, social security number). In the same scenario, some of the customer data may reside with the financial services provider associated with the car OEM credit card. This information may be useful to the car OEM to make specific offers to the customer, in terms of car model, trim, optional equipment, and financing options.

b. Another example is the assessment of a company's customer base in the context of an acquisition by, or partnership with, a second company. The first company would not want to share the actual customer base with the second company, in case the deal falls through.

c. A third example is continuous risk assessment of person or company risk from a financial perspective. The purpose might be for looking at potential default on loans, money laundering, violation of regulation, tax cheating. Because of multiple jurisdictions, mandates, information about a business or person cannot be readily shared.

d. Another example is assessing the health of a person. Because of HIPAA, test information, medical information cannot be passed from entity to entity without control.

e. Yet another example is the ability of a social network to sell information about the behavior of its members in a given context, say for a given product or vendor, without the need to reveal detailed information about individual members, but still allowing for finer resolution than possible with the creation of groups or cohorts of individuals.

f. Yet another aggregation of anonymized customer-related time series from multiple parties may signal future changes in market conditions, presenting investment opportunities or providing a measure of consumer confidence, or GDP.

Reference to parties and other entities performing various acts herein should be understood to refer to programmed computing systems executing processes effectuating such acts on behalf of the referenced entity.

The machine learning techniques that can be used in this system include the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC) Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models.

FIG. 1 is a schematic block diagram of an example of a computing system 10 in which the present techniques may be implemented. The computing system 10 may include the features described in U.S. Patent App. 62/714,252, titled MULTI-PARTY AND PRIVACY-ENABLED SCALABLE MACHINE LEARNING SYSTEM AND TOKENS, filed 3 Aug. 2018, the contents of which are hereby incorporated by reference. In some embodiments, the above-described upstream model may be a downstream model relative to some other upstream model, and in some cases, different token-outputting models may be changed or otherwise configured in a call graph, in some cases with some models outputting multiple types of tokens corresponding to different downstream use cases. Some embodiments may include 3, 5, 10 or much such stages arranged in a call graph.

In some embodiments, the computing system 10 is configured to ingest data from a raw data source 12, which in some cases may include tokens 14 output by an upstream model, telemetry data 16, risk data 18, third-party data 20, social data 22, and customer data 24. This raw data may be input as a batch or a stream into an extract, transform, and load (ETL) pipeline 26, which may load the data in a standardized, normalized, validated, and cleansed format in data store 28, in some cases organizing the data into events 30, factors 32, and tokens 34. In some embodiments, these records may correspond to the customer journeys described in U.S. patent application Ser. No. 15/456,059, titled BUSINESS ARTIFICIAL INTELLIGENCE MANAGEMENT ENGINE, the contents of which are hereby incorporated by reference.

In some embodiments, various stored records may correspond to entries in an ontology 40 within a labels bank 36, which may include a labeling module 38 configured to classify entries in records by labeling those entries with values in the ontology 40 to which the entries correspond. Some embodiments may output the labeled records into a set of one or more latent value or hidden variable models 42. Examples include models in which some unobservable aspect of a system being modeled affects observable behavior of the system, such as customer sentiment, values ascribed by customers to various events, behavior of threat actors, and the like. The models 42 may output various tokens 44 suitable for ingest in a models bank 46 or a business rules bank 60, in some cases. In some embodiments, the models bank 46 further receives labeled entries from the labels bank 36. In some embodiments, the illustrated tokens may demarcate boundaries of different entities computer systems, such that information is shared across the boundary in a constrained fashion, or in some cases the entire computer system 10 may be operated by a single entity, and the tokens may tend to reduce an attack surface in a data breach by constraining the amount of information accessible to a threat actor with access to one portion of the system 10.

In some embodiments, the models bank 46 may include various types of models, such as a purchase model 48, a service model 50, a subscription model 52, an incentive model 54, a risk model 56, and an efficiency model 58. In some embodiments, one or more these models may output respective tokens 64, which may be ingested by the business rules bank 60, which may store a plurality of business rules 62 indicative of heuristics, operations research results, policies, and the like, and in some cases a rules engine may apply these rules by mapping the tokens 44 and the tokens 64 to various criteria of the rules and applying the rules with a rules engine, for example in a processing loop. In some embodiments, the rules bank 60 may output various types of tokens, such as values token 66, actions tokens 68, and scores tokens 70, which may be ingested by various information technology computer systems 72 or other downstream models. In some embodiments, these tokens may be conveyed via various networks 74, such as the Internet, for example to a remote recommendation engine 76 or an analytics engine 78.

Figure 2:
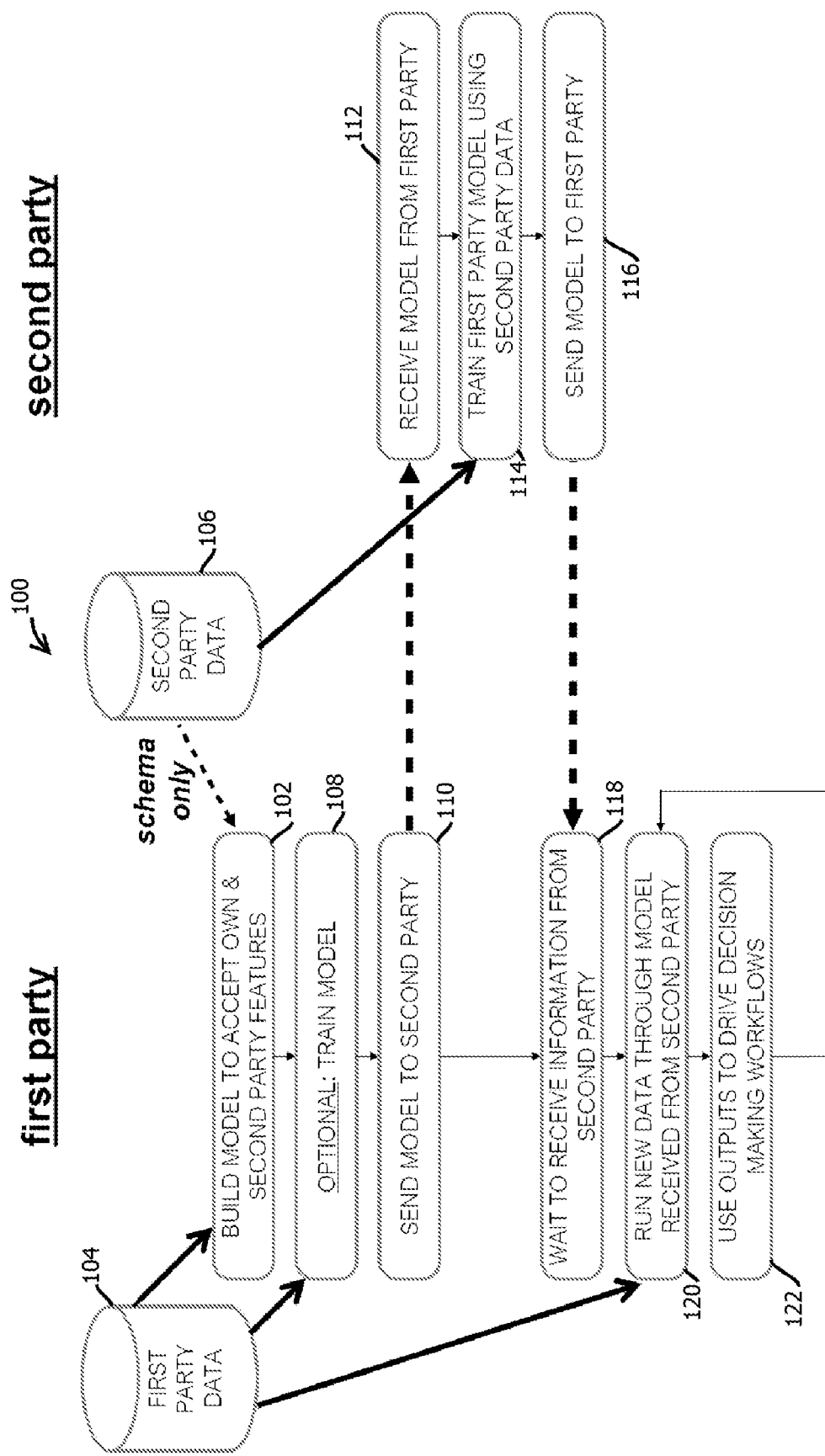
FIG. 2 is a flowchart illustrating an example of a process implementing two-party collaborative decision making in accordance with some embodiments.

FIG. 2 is a hybrid information flow diagram and flowchart illustrating the construction of a multiparty model. In some embodiments, the processes of FIGS. 2 through 4 may be implemented with the computer system 10 of FIG. 1, in some cases using a collection of the computing devices described below with reference to FIG. 5. The illustrated process and the other functionality described herein may be implemented with program code or other instructions stored on a tangible, non-transitory, machine-readable medium, such that when those instructions are executed, the described functionality may be effectuated by one or more processors. In some embodiments, different processors may execute different subsets of the instructions, and in some cases, different subsets of the content instructions may be stored on memory of different computing devices, an arrangement consistent with use of the singular term "medium" as used herein.

In some embodiments, the process 100 may begin with building a model to accept a first party's own (e.g., accessible to the first part but a least in part not accessible to a second party) data and a second party's features, as indicated by block 102. The first party may be a party controlling an upstream model and the second party may be a party controlling a downstream model consistent with the description above. In some embodiments, the first party's model may be configured to accept data in a first parties data repository 104, at least some of which may be inaccessible to the second party. In some embodiments, the first party's model may also accept a schema from the second party, such as from a second party data store 106. In some cases, the schema may specify attributes (e.g., identity, type, format, etc.) of an input feature set for a second model. In some embodiments, the first party builds a model including the relevant features of its own data and the expected features to come from the second party data. The latter may be provided as metadata, such as in a schema, without providing any actual data in some cases. In some embodiments, the model may be built to produce outputs indicative of an objective metric, for instance, values upon which the first party makes determinations for subsequent computing processes.

Next, some embodiments may include training the model, as indicated by block 108. The operation is labeled as optional in the figure, but it should be emphasized that the absence of the optional label elsewhere should not be read to imply that any other step is required. Training may include various forms of training consistent with the type of model, examples including various forms of gradient descent, simulated annealing, evolutionary algorithms, Bayesian optimization, CART, Baum Welch, and the like, depending upon the type of model.

Next, some embodiments may send the model to a second party, as indicated by block 110. In some embodiments, sending the model may include sending a model architecture, model parameters arrived at as a result of training, and hyper parameters applied during training. In some embodiments, the second party may receive the model from the first party, as indicated by block 112, and train the first party's model using second party data, as indicated by block 114. In some embodiments, training may include updating an existing trained model (or appending additional layers or other models to the model, thereby adding parameters that are jointly optimized with those of the first party's model). Next, some embodiments may return the model after training to the first party, as indicated by block 116. Reference to first party and second party should be understood to refer to actions performed by computing systems under the control of different entities, and not actions performed by human beings, which is not to suggest that humans may not perform intervening steps to effectuate such operations.

Next, some embodiments may include waiting to receive information from the second party, as indicated by block 118, such as receiving the sent model. Some embodiments may then run new data through the model, for instance, from the first party data repository 104, as indicated by block 120. In some cases, the new data was not used to train the model prior to the model being sent to the second party. Some embodiments may use outputs of the received model responsive to the new data to drive decision-making workflows, as indicated by block 122, e.g., by mapping the outputs to rule criteria in the rules bank 60. In some cases, this process may repeated at runtime indefinitely until a new model is received.

FIG. 2 is best understood with reference to an example use case. In the example, the first party is an automotive manufacturer with limited data about its customers. It wants to improve its ability to provide product suggestions to its customers when they navigate the manufacturer's website or otherwise interact with their sales people. In the example, the second party is a social network with access to large amounts of data about its members. In the example, the following operations may be executed:

a. In some embodiments, the first party builds a model to accept all relevant features in the customer data it owns, plus any features the social network may own about its members. The model is built to produce the outputs of interest to the first party.

b. In some embodiments, depending on the richness of first party data, it may train the model using the available data.

c. In some embodiments, the first party sends elements of untrained or trained model to second party.

d. In some embodiments, the second party receives the model and trains it, if untrained, using second party data. For some kinds of models, such as those using reinforcement learning, it may be possible to enhance the model eve if it had been initially trained by first party.

e. In some embodiments, the second party returns the model to first party after training it.

f. In some embodiments, the second party returns, possibly in addition to (e) above, the results of running the trained model on second party data.

g. In some embodiments, the first party uses the results or model received from second party to inform its decision making processes.

Figure 3:
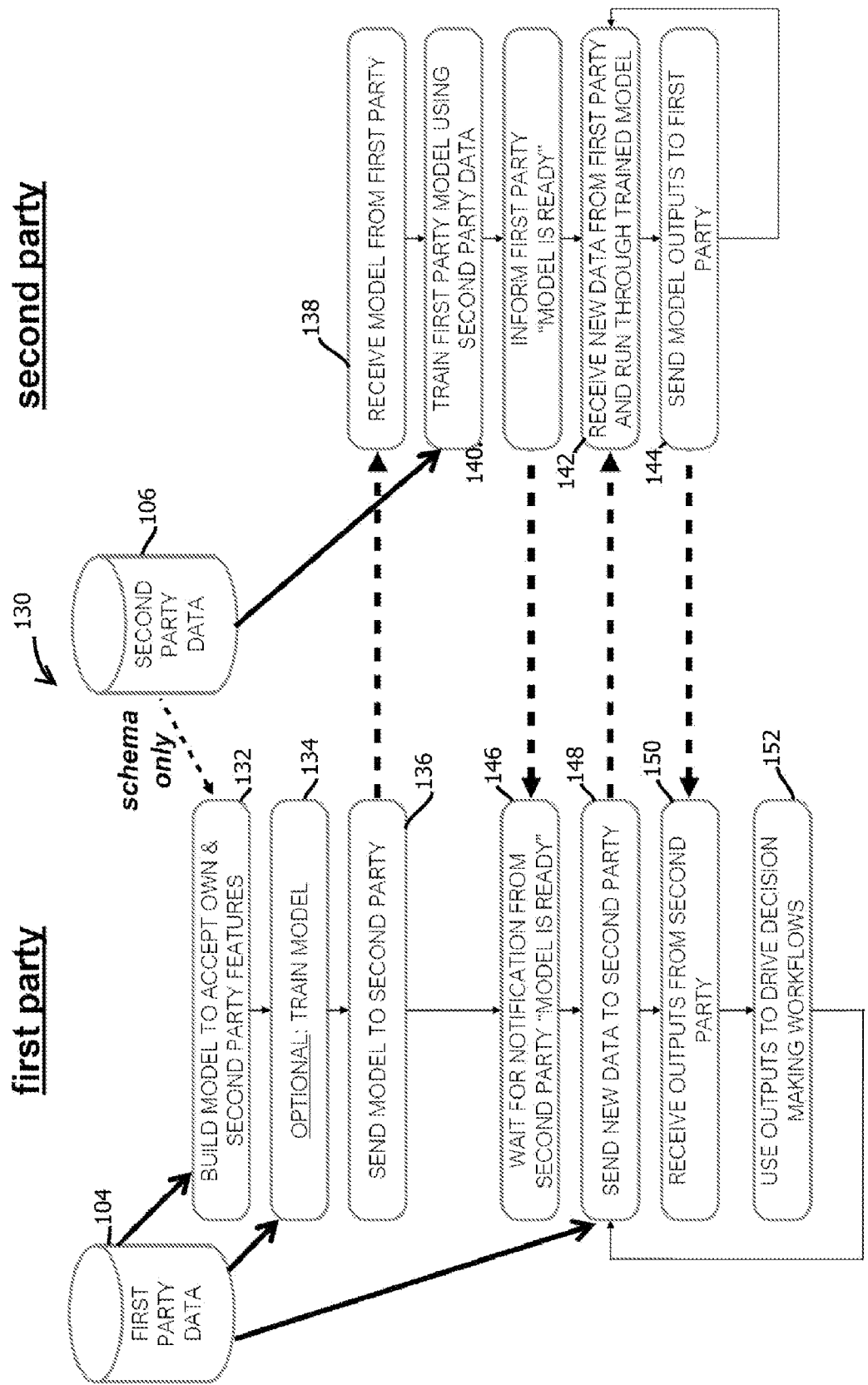
FIG. 3 is a flowchart illustrating another example of a process implementing two-party collaborative decision making in accordance with some embodiments.

FIG. 3 shows another hybrid flowchart and data flow diagram of a process 130, which in some cases may be implemented with the computing system described below above with reference to FIG. 1. In some embodiments, the process 130 includes operations like those described above. In some embodiments, the process 130 includes building a model to accept the first party's own data and second party features, consistent with the techniques described above, as indicated by block 132. Some embodiments may further include training a model, as indicated by block 134. Again, the optional designation should not be read to imply that other steps are required.

Some embodiments include sending the trained model or untrained model to a second party, as indicated by block 136, and that second party may receive the model from the first party, as indicated by block 138. Some embodiments include training the first party model using second party data, as indicated by block 140, and informing the first party that the model is ready, as indicated by block 142. In some embodiments, the first party may wait for notification from the second party that the model is ready, as indicated by block 146, and responsive to receiving the notification, send new data to the second party, as indicated by block 148. In some embodiments, the new data is, or includes, secret data from the first party data repository 104, which in some cases may include data that was not used to train the model before it was sent to the second party.

In some embodiments, the second party may receive the new data from the first party and run the new data through the trained model, as indicated by block 143. In some embodiments, the process may include sending model outputs to the first party, as indicated by block 144 and returning to receive new data. In some embodiments, the first party may receive outputs from the second party, as indicated by block 150, and use the outputs to drive decision-making workflows, as indicated by block 152, for instance, in downstream computing processes. The process may further include returning to send new data to the second party in block 148.

Figure 4:
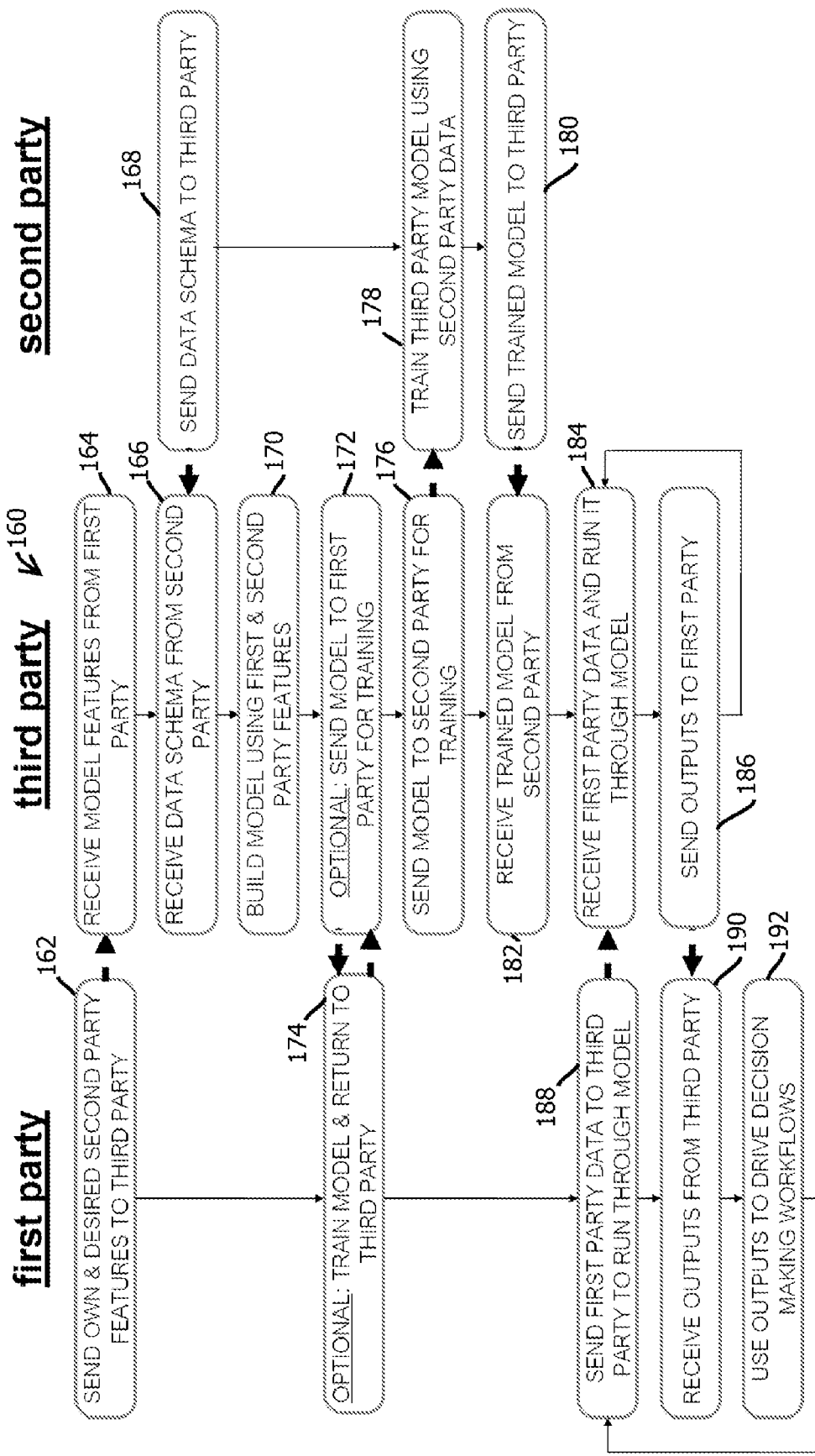
FIG. 4 is a flowchart illustrating a third example of a process implementing two-party collaborative decision making in accordance with some embodiments.

FIG. 4 is a flowchart depicting another example of a process 160, which in this case may implement a software as a service (SaaS) architecture among computing systems controlled by three different parties, with those different computing systems effectuating the operations under the corresponding headings in FIG. 4 (a convention followed above as well with reference to FIGS. 2 and 3). In some embodiments, the process 160 includes the first party sending its own data and a description of desired (for example specified) second party data features to a third party, as indicated by block 162. In some embodiments, the third party may host a computing system that is accessed via an application program interface and provided to multiple tenants to afford functionality like that described above, for example in a SaaS architecture.

In some embodiments, the process includes the third party's computer system receiving model features from the first party, as indicated by block 164, and receiving a data schema from a second party, as indicated by block 166, which may be received responsive to the second party sending the data schema to the third party, as indicated by block 168. In some embodiments, either the first party's computer system or the third party's computer system may request the schema from the second party. In some embodiments, additional information may be provided along with the schema.

Some embodiments include building a model using first and second party features, as indicated by block 170, and sending the model to the first party for training, as indicated by block 172. In some embodiments, the first party's computer system may receive the sent model and train the sent model with, for example, data to which only the first party has access, and return the train model to the third party, as indicated by block 174, for instance, in the manner described above by which models are conveyed.

In some embodiments, the third party may send the model to a second party for training, as indicated by block 176, and the second party may train the third-party model using second party data, as indicated by block 178, before sending the train model to the third party, as indicated by block 180. In some embodiments, the third party may receive the train model from the second party, as indicated by block 182.

In some embodiments, the preceding operations may be performed at training time, while the following operations may be executed at run time, such as at inference time. In some embodiments, the third party may receive first party data, such as data that was not used to train the model, and run it through the model received from the second party, as indicated by block 184. For example, the first party may send first party data to the third party to run through (e.g., be input to) the model, as indicated by block 188. In some embodiments, the third party may send outputs of the model responsive to the received data to the first party, as indicated by block 186, and the first party's computer system may receive outputs from the third party, as indicated by block 190. In some embodiments, the first party may use the outputs to drive decision-making workflows, as indicated by block 192. Examples of such decision-making include outputting the results to the business rules bank 60 described above or driving the various decisions described in the applications incorporated by reference.

Figure 5:
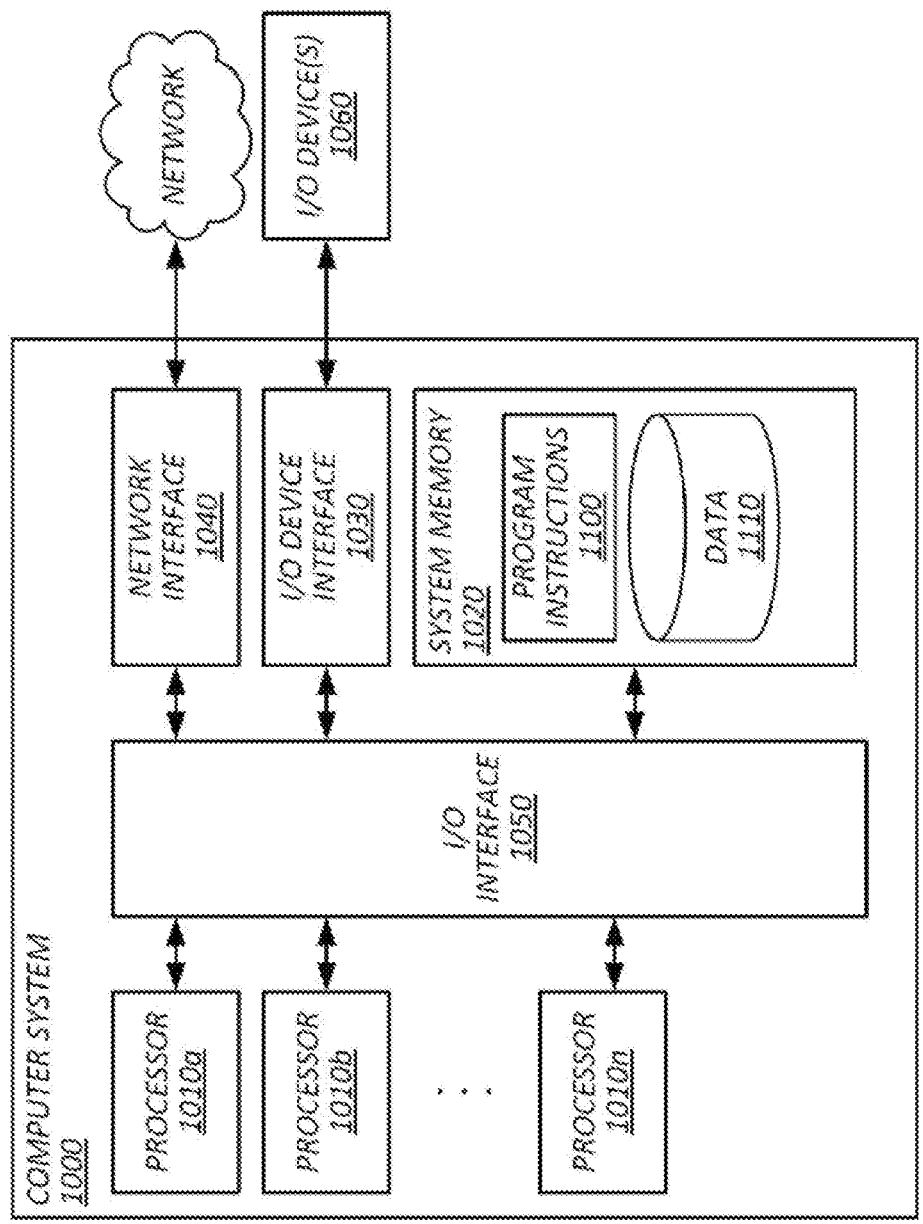
FIG. 5 is an example of a computing system by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1A. A tangible, non-transitory, machine-readable medium, storing instructions that when executed by one or more processors effectuate operations comprising: obtaining, with one or more processors, a first trained machine learning model, wherein: the first machine learning model is trained on a first training set that includes data the first entity is not permitted to provide to a second entity, the first trained machine learning model is configured to output tokens, and the tokens do not reveal more than a threshold amount of information about the data the first entity is not permitted to provide to the second entity; receiving, with one or more processors, a first set of input features with the first trained machine learning model and, in response, outputting a first token; and causing, with one or more processors, the first token and a first value associated with the first token to be input into a second trained machine learning model accessible to the second entity, wherein the first value associated with the first token is a token-context value corresponding to the first token.

2A. The medium of embodiment 1A, wherein: the first value is a member of a set of feature values input into the first model to cause the first model to output the first token.

3A. The medium of any one of embodiments 1A-2A, the operations comprising: causing the first token and a second value associated with the first token to be input into a third trained machine learning model accessible to a third entity but not the second entity.

4A. The medium of embodiment 3A, wherein: the first token is based on a value of a secret random variable input into the first model to generate the first token along with the first value and the second value.

5A. The medium of embodiment 4A, wherein: a first conditional probability distribution of the secret random variable given the first token and the first value is different from a second conditional probability distribution of the secret random variable given the first token and the second value.

6A. The medium of any one of embodiments 1A-5A, wherein: the token-context value is selected to modulate an amount of information provided to the second entity about the data the first entity is not permitted to provide to the second entity.

7A. The medium of any one of embodiments 1A-6A, wherein the operations comprise: receiving a second set of input features with the first trained machine learning model and, in response, outputting a second token; and causing, with one or more processors, the second token and a second value associated with the second token to be input into the second trained machine learning model accessible to the second entity.

8A. The medium of embodiment 7A, wherein: the first token, the first value, the second token, and the second value are configured to be part of a training set by which the second machine learning model is trained or re-trained.

9A. The medium of embodiment 7A, wherein: the first token, the first value, the second token, and the second value are configured to be part of input feature sets by which the second machine learning model generates outputs.

10A. The medium of any one of embodiments 1A-9A, wherein: the operations comprise training the first machine learning model by adjusting parameters of the first machine learning model based on an objective function and a training set.

11A. The medium of embodiment 10A, wherein: the objective function is based on both an effectiveness of the first machine learning model at predicting label values in the training set and an amount of information conveyed by token values about at least some features in the training set to which the label values correspond.

12A. The medium of embodiment 11A, wherein: training the first machine learning model tends to adjust parameters of the first machine learning model to both increase accuracy of the first machine at predicting label values in the training set and decrease amounts of information conveyed by token values about secret features in the training set to which the label values correspond relative to results from model parameters subject to earlier adjustments in the training.

13A. The medium of embodiment 10A, wherein: the first machine learning model is a supervised machine learning model; and training effectuates a lossy compression of the training set that is encoded in parameters of the first machine learning model.

14A. The medium of any one of embodiments 1A-13A, wherein: the tokens correspond to a principle component of an input feature set of the first machine learning model with respect to an objective metric of the first machine learning model.

15A. The medium of embodiment 14A, wherein: the tokens are configured to discriminate outputs along a dimension corresponding to the principle component for the first training set.

16A. The medium of any one of embodiments 1A-15A, wherein the operations comprise: inputting the first token and a second token output by the second machine learning model into a rules bank.

17A. The medium of any one of embodiments 1A-16A, wherein: the first trained machine learning model is configured to accept a second token from an upstream third machine learning model as part of the first set of input features upon which the first token is based.

18A. The medium of any one of embodiments 1A-17A, wherein the operations comprise: concurrently training the first machine learning model and the second machine learning model by adjusting parameters of the first machine learning model and the second machine learning model based on the first training set, a second training set of the second entity, and a single objective function applied to training both the first machine learning model and the second machine learning model.

1B. A tangible, non-transitory, machine-readable medium, storing instructions that when executed by one or more processors effectuate operations comprising: obtaining, from a first computer system, at a second computer system, an output of an upstream machine learning model executed by the first computer system and a value that corresponds to a subset of entities having respective records in a data repository accessible to the second computer system; retrieving, with the second computer system, based on the value, from the data repository, features of members of the subset of entities indicated in corresponding records in the data repository; inferring, with a downstream machine learning model executed by the second computer system, based on the output of the upstream machine learning model and the retrieved features of members of the subset of entities, a property of the a member of the subset of entities; and storing, with the second computer system, the property in association with the member of the subset of entities in memory.

2B. The medium of embodiment 1B, wherein: the second computer system does not have access to at least some input features of the upstream machine learning model upon which the output is based.

3B. The medium of 1B, wherein: the subset of entities are a subset of people having profiles in the data repository; and the subset is less than 10% of the people having profiles in the data repository.

4B. The medium of any one of embodiments 1B-3B, wherein: the value uniquely identifies an entity among entities having respective records in the data repository; and at least some information in a record of the uniquely identified entity is not available to the first computer system.

5B. The medium of any one of embodiments 1B-3B, wherein: the output is a token; and the value comprises a token-context value.

6B. The medium of any one of embodiments 1B-3B, wherein: the output comprises a vector output by an autoencoder of the first computer system, the autoencoder being trained to map higher-dimensional inputs in records available to the first computer system but not the second computer system into lower-dimensional vectors that preserve at least some information in records available to the first computer system without revealing all input features to the autoencoder.

7B. The medium of any one of embodiments 1B-6B, wherein: the upstream machine learning model and the downstream machine learning models are trained separately.

8B. The medium of any one of embodiments 1B-6B, wherein: the upstream machine learning model and the downstream model are jointly trained.

9B. The medium of any one of embodiments 1B-8B, wherein: the upstream machine learning model and the downstream machine learning model cooperate to infer affinity of an entity for a product or service without sharing at least some input features of the upstream machine learning model with the second computer system.

10B. The medium of embodiment 9B, wherein: at least some input features of the downstream machine learning model are not shared with the first computer system.

11B. The medium of any one of embodiments 1B-8B, wherein: no input features of the upstream machine learning model upon which the output is based are communicated to the second computer system, other than the value to the extent the value is an input feature.

12B. The medium of any one of embodiments 1B-8B, wherein: the upstream machine learning model and the downstream machine learning model cooperate to score performance of an entity for a product or service without sharing at least some input features of the upstream machine learning model with the second computer system.

13B. The medium of embodiment 12B, wherein: the score is one of a sequence of scores over time in an iterated risk assessment.

14B. The medium of embodiment 13B, wherein: the iterated risk assessment is a continuous risk assessment.

15B. The medium of embodiment 12B, wherein: the performance score is indicative of cybersecurity risk.

16B. The medium of any one of embodiments 1B-15B, wherein: the upstream machine learning model and the downstream machine learning model cooperate to recommend a product or service for an entity without sharing at least some input features of the upstream machine learning model with the second computer system.

17B. The medium of any one of embodiments 1B-16B, wherein: the second machine learning model comprises means for machine learning; and the operations comprise providing, from the second computer system, to a third computer system, the property and another value that corresponds to a subset of entities having respective records in a data repository accessible to the third computer system.

18B. The medium of any one of embodiments 1B-17B, wherein: the output is token corresponding to a principle component of input features of the first machine learning model.

19B. The medium of any one of embodiments 1B-18B, wherein: the output is based on a combination of a response of the first machine learning model to a set of input features and noise that obfuscates the set of input features and the response while causing at least some population statistics of a set of outputs of the first machine learning model to change by less than 10% relative to a set of outputs that are not combined with the noise.

19. A method, comprising: the operations of any one of embodiments 1A-19B.

20. A system, comprising: one or more processors; and memory storing instructions that when executed by at least some of the processors effectuate operations comprising: the operations of any one of embodiments 1A-19B.

What is claimed is:

1. A tangible, non-transitory, machine-readable medium, storing instructions that when executed by one or more processors effectuate operations comprising:
obtaining, from a first computer system, at a second computer system, an output of an upstream machine learning model executed by the first computer system and a value that corresponds to a subset of entities having respective records in a data repository accessible to the second computer system, wherein;
the output comprises a vector output by an autoencoder of the first computer system, the autoencoder being trained to map higher-dimensional inputs in records available to the first computer system but not the second computer system into lower-dimensional vectors that preserve at least some information in records available to the first computer system without revealing all input features to the autoencoder;
retrieving, with the second computer system, based on the value, from the data repository, features of members of the subset of entities indicated in corresponding records in the data repository;
inferring, with a downstream machine learning model executed by the second computer system, based on the output of the upstream machine learning model and the retrieved features of members of the subset of entities, a property of a member of the subset of entities; and
storing, with the second computer system, the property in association with the member of the subset of entities in memory.

2. The medium of claim 1, wherein:
the second computer system does not have access to at least some input features of the upstream machine learning model upon which the output is based.

3. The medium of claim 1, wherein:
the subset of entities is a subset of people having profiles in the data repository; and
the subset is less than 10% of the people having profiles in the data repository.

4. The medium of claim 1, wherein:
the value uniquely identifies an entity among entities having respective records in the data repository; and
at least some information in a record of the uniquely identified entity is not available to the first computer system.

5. The medium of claim 1, wherein:
the output is a token; and
the value comprises a token-context value.

6. The medium of claim 1, wherein:
the upstream machine learning model and the downstream machine learning models are trained separately.

7. The medium of claim 1, wherein:
the upstream machine learning model and the downstream machine learning model are jointly trained.

8. The medium of claim 1, wherein:
the upstream machine learning model and the downstream machine learning model cooperate to infer affinity of an entity for a product or service without sharing at least some input features of the upstream machine learning model with the second computer system.

9. The medium of claim 8, wherein:
at least some input features of the downstream machine learning model are not shared with the first computer system.

10. The medium of claim 1, wherein:
no input features of the upstream machine learning model upon which the output is based are communicated to the second computer system, other than the value to the extent the value is an input feature.

11. The medium of claim 1, wherein:
the upstream machine learning model and the downstream machine learning model cooperate to score performance of an entity for a product or service without sharing at least some input features of the upstream machine learning model with the second computer system.

12. The medium of claim 11, wherein:
the score is one of a sequence of scores over time in an iterated risk assessment.

13. The medium of claim 12, wherein:
the iterated risk assessment is a continuous risk assessment.

14. The medium of claim 11, wherein:
the performance score is indicative of cybersecurity risk.

15. The medium of claim 1, wherein:
the upstream machine learning model and the downstream machine learning model cooperate to recommend a product or service for an entity without sharing at least some input features of the upstream machine learning model with the second computer system.

16. The medium of claim 1, wherein:
the second machine learning model comprises means for machine learning; and
the operations comprise providing, from the second computer system, to a third computer system, the property and another value that corresponds to a subset of entities having respective records in a data repository accessible to the third computer system.

17. The medium of claim 1, wherein:
the output is a token corresponding to a principle component of input features of the upstream machine learning model.

18. The medium of claim 1, wherein:
the output is based on a combination of a response of the upstream machine learning model to a set of input features and noise that obfuscates the set of input features and the response while causing at least some population statistics of a set of outputs of the first upstream machine learning model to change by less than 10% relative to a set of outputs that are not combined with the noise.

19. A tangible, non-transitory, machine-readable medium, storing instructions that when executed by one or more processors effectuate operations comprising:
obtaining, from a first computer system, at a second computer system, an output of an upstream machine learning model executed by the first computer system and a value that corresponds to a subset of entities having respective records in a data repository accessible to the second computer system, wherein:
the output is based on a combination of a response of the upstream machine learning model to a set of input features and noise that obfuscates the set of input features and the response while causing at least some population statistics of a set of outputs of the upstream machine learning model to change by less than 10% relative to a set of outputs that are not combined with the noise;
retrieving, with the second computer system, based on the value, from the data repository, features of members of the subset of entities indicated in corresponding records in the data repository;
inferring, with a downstream machine learning model executed by the second computer system, based on the output of the upstream machine learning model and the retrieved features of members of the subset of entities, a property of a member of the subset of entities; and
storing, with the second computer system, the property in association with the member of the subset of entities in memory.

20. A tangible, non-transitory, machine-readable medium, storing instructions that when executed by one or more processors effectuate operations comprising:
obtaining, from a first computer system, at a second computer system, an output of an upstream machine learning model executed by the first computer system and a value that corresponds to a subset of entities having respective records in a data repository accessible to the second computer system;
retrieving, with the second computer system, based on the value, from the data repository, features of members of the subset of entities indicated in corresponding records in the data repository;
inferring, with a downstream machine learning model executed by the second computer system, based on the output of the upstream machine learning model and the retrieved features of members of the subset of entities, a property of a member of the subset of entities in memory; and providing, from the second computer system, to a third computer system, the property and another value that corresponds to a subset of entities having respective records in a data repository accessible to the third computer system.

21. A tangible, non-transitory, machine-readable medium, storing instructions that when executed by one or more processors effectuate operations comprising:
obtaining, from a first computer system, at a second computer system, an output of an upstream machine learning model executed by the first computer system and a value that corresponds to a subset of entities having respective records in a data repository accessible to the second computer system;
retrieving, with the second computer system, based on the value, from the data repository, features of members of the subset of entities indicated in corresponding records in the data repository;
inferring, with a downstream machine learning model executed by the second computer system, based on the output of the upstream machine learning model and the retrieved features of members of the subset of entities, a property of a member of the subset of entities, wherein:
the upstream machine learning model and the downstream machine learning model cooperate to score performance of an entity for a product or service without sharing at least some input features of the upstream machine learning model with the second computer system;
the score is one of a sequence of scores over time in an iterated risk assessment; and
storing, with the second computer system, the property in association with the member of the subset of entities in memory.

22. The medium of claim 21, wherein:
the iterated risk assessment is a continuous risk assessment.

23. The medium of claim 21, wherein:
the score is indicative of cybersecurity risk.

* * * * *